US010944520B2

(12) United States Patent
Maleki et al.

(10) Patent No.: US 10,944,520 B2
(45) Date of Patent: Mar. 9, 2021

(54) SYSTEM AND METHOD FOR COMMON PHASE ERROR AND INTER-CARRIER INTERFERENCE ESTIMATION AND COMPENSATION

(71) Applicant: Samsung Electronics Co., Ltd., Suwon-si (KR)

(72) Inventors: Hamed Maleki, San Diego, CA (US); Pranav Dayal, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/403,889

(22) Filed: May 6, 2019

(65) Prior Publication Data

US 2019/0327042 A1    Oct. 24, 2019

Related U.S. Application Data

(62) Division of application No. 15/880,419, filed on Jan. 25, 2018, now Pat. No. 10,341,066.

(60) Provisional application No. 62/541,035, filed on Aug. 3, 2017.

(51) Int. Cl.
| | | |
|---|---|---|
| *H04L 5/00* | (2006.01) | |
| *H04L 5/12* | (2006.01) | |
| *H04L 25/03* | (2006.01) | |
| *H04L 27/26* | (2006.01) | |
| *H04L 25/02* | (2006.01) | |
| *H04L 27/00* | (2006.01) | |

(52) U.S. Cl.
CPC ............ *H04L 5/0007* (2013.01); *H04L 5/005* (2013.01); *H04L 5/0051* (2013.01); *H04L 5/12* (2013.01); *H04L 25/0202* (2013.01); *H04L 25/0226* (2013.01); *H04L 25/03821* (2013.01); *H04L 27/266* (2013.01); *H04L 2027/0067* (2013.01)

(58) Field of Classification Search
CPC ... H04L 5/0007; H04L 5/12; H04L 25/03821; H04L 5/0051; H04L 27/266; H04L 5/005; H04L 25/0226; H04L 25/0202
See application file for complete search history.

(56) References Cited

U.S. PATENT DOCUMENTS

| | | |
|---|---|---|
| 8,261,169 B2 | 9/2012 | Kishigami et al. |
| 8,311,550 B2 | 11/2012 | Miki et al. |
| 9,722,768 B2 | 8/2017 | Inoue et al. |
| 2005/0078599 A1 | 4/2005 | Zhidkov et al. |
| 2007/0025461 A1 | 2/2007 | Park et al. |

(Continued)

FOREIGN PATENT DOCUMENTS

KR    10-1089502 B1    12/2011

OTHER PUBLICATIONS

"On DL PT-RS design", 3GPP TSG RAN WG1 Meeting #89, R1-1707976, May 15-19, 2017, 5 pages, Hangzhou, China.

(Continued)

*Primary Examiner* — Brenda H Pham
(74) *Attorney, Agent, or Firm* — Lewis Roca Rothgerber Christie LLP

(57) ABSTRACT

A system and method for transmitting an orthogonal frequency-division multiplexed signal with a group distributed phase tracking reference signal subcarrier structure, and for estimating, and compensating for, both common phase error, and inter-carrier interference.

20 Claims, 10 Drawing Sheets

(56) References Cited

U.S. PATENT DOCUMENTS

2007/0223359 A1    9/2007  Li et al.
2018/0278394 A1*   9/2018  Wang .................... H04L 5/0051
2019/0222385 A1*   7/2019  Hessler ................ H04W 56/00
2019/0350038 A1*  11/2019  Li ........................ H04L 5/0051

OTHER PUBLICATIONS

"Phase noise model for above 6 GHz", 3GPP TSG RAN WG1 Meeting #85, R1-164041, May 23-27, 2016, 6 pages, Nanjing, China.

Zou, Qiyue et al., "Compensation of Phase Noise in OFDM Wireless Systems", IEEE Transactions on Signal Processing, Nov. 2007, pp. 5407-5424, vol. 55, No. 11, IEEE.

* cited by examiner

SYSTEM AND METHOD FOR COMMON PHASE ERROR AND INTER-CARRIER INTERFERENCE ESTIMATION AND COMPENSATION

CROSS-REFERENCE TO RELATED APPLICATION(S)

The present application is a divisional application of U.S. patent application Ser. No. 15/880,419, filed Jan. 25, 2018, which claims priority to and the benefit of U.S. Provisional Application No. 62/541,035 filed Aug. 3, 2017, entitled "SYSTEM AND METHOD FOR PHASE TRACKING REFERENCE SIGNAL (PTRS) STRUCTURE AND FREQUENCY DOMAIN PHASE NOISE COMMON PHASE ERROR (CPE) AND INTER-CARRIER INTERFERENCE (ICI) COMPENSATION". The entire contents of both of the applications identified in this paragraph are incorporated herein by reference.

FIELD

One or more aspects of embodiments according to the present disclosure relate to communication systems, and more particularly, to a system and method for common phase error and inter-carrier interference estimation and compensation.

BACKGROUND

Phase noise, caused by oscillator imperfections, affects the orthogonality of subcarriers in an orthogonal frequency-division multiplexing (OFDM) system. The phase noise process may be random in nature and for a phase-locked loop (PLL) based oscillator, it effectively causes a rotation of time domain baseband samples of the in-phase and quadrature components (IQ samples) by a small amount, and the randomness can be characterized by a power spectral density (PSD) in the frequency domain. This leads to a common phase error (CPE), which has similar impact on each subcarrier, and inter-carrier interference (ICI), which may be different for each subcarrier and may cause scattering of the received constellation points in OFDM based systems. The total power of CPE and ICI observed at the center tone may be the integrated phase noise PN (IPN), which may also be obtained by integrating the PSD of the PN process over the occupied bandwidth (BW). If the phase noise PSD is wide compared to the subcarrier spacing, more of the total power of the phase noise (IPN) will be contributed as ICI instead of as CPE. The phase noise may be particularly severe for higher carrier frequencies such as millimeter-wave frequency bands above 6 GHz.

A phase tracking reference signal (PTRS) has been introduced in the New Radio (NR) standard, to enable compensation of oscillator phase noise. PTRS may be utilized at high carrier frequencies (such as millimeter-wave) to mitigate phase noise. However, a fully distributed PTRS structure may be suitable only for CPE estimation and compensation, and may not be of use in mitigating ICI.

SUMMARY

Aspects of embodiments of the present disclosure are directed toward a system and method for transmitting an orthogonal frequency-division multiplexed signal with a group distributed phase tracking reference signal subcarrier structure, and for estimating, and compensating for, both common phase error, and inter-carrier interference.

According to an embodiment of the present disclosure there is provided a method, including: estimating a channel using demodulation reference signal subcarriers from a received signal; estimating a common phase error term using the estimated channel and phase tracking reference signal subcarriers; and estimating one or more inter-carrier interference terms, including: canceling, from the received signal, the estimated common phase error term to form a first compensated received signal; and estimating, based on the first compensated received signal, a first inter-carrier interference term.

In one embodiment, the method further includes calculating a value of the transmitted signal in a subcarrier using known PTRS pilots.

In one embodiment, the estimating of the inter-carrier interference terms further includes: iteratively, for a range of values of an integer i greater than 1 and less than a set integer L: canceling, from a received signal, the estimated common phase error, and the first through (i−1)-th inter-carrier interference terms, to form an i-th compensated received signal; and estimating, using the i-th compensated received signal, an i-th inter-carrier interference term.

In one embodiment, the estimating of the common phase error includes calculating a phase of the estimated common phase error according to $\angle \hat{J}[0] = \angle((\hat{H}[\mathcal{K}]X[\mathcal{K}])^H Y[\mathcal{K}])$, wherein: $\mathcal{K}$ is a set of phase tracking reference signal subcarriers; $[\mathcal{K}]$ is a diagonal matrix the p-th diagonal element of which is equal to the estimated channel response for the p-th subcarrier from among the set $\mathcal{K}$; $X[\mathcal{K}]$ is the transmitted signal in subcarriers from among the set $\mathcal{K}$; $Y[\mathcal{K}]$ is the received signal in subcarriers from among the set $\mathcal{K}$; and H as a superscript denotes a conjugate transpose.

In one embodiment, the estimating of the common phase error further includes setting an amplitude of the estimated common phase error to be equal to 1.

In one embodiment, the phase tracking reference signal subcarriers include $N_c N_{PTRS}$ subcarriers, arranged in $N_c$ groups, each of the $N_c$ groups including $N_{PTRS}$ adjacent subcarriers.

In one embodiment, the canceling, from the received signal, the estimated common phase error, and the first through (i−1)-th inter-carrier interference terms, to form the i-th compensated received signal, includes calculating the i-th compensated received signal $Y_{SIC}[\mathcal{K}_{ii}]$ according to $$Y_{SIC}[\mathcal{K}_{ii}] = Y[\mathcal{K}_{ii}] - \hat{J}[0]\hat{H}[\mathcal{K}_{ii}]X[\mathcal{K}_{ii}], \text{ for } i=1,$$
and $$[\mathcal{K}_{ii}] = Y[\mathcal{K}_{ii}] - \hat{J}[0]\hat{H}[\mathcal{K}_{ii}]X[\mathcal{K}_{ii}] - \hat{J}[1]\hat{H}$$
$$[\mathcal{K}_{(i-1)(i+1)}]X[\mathcal{K}_{(i-1)(i+1)}] - \hat{J}[-1]\hat{H}[\mathcal{K}_{(i+1)(i-1)}]$$
$$X[\mathcal{K}_{(i+1)(i-1)}] - \ldots - \hat{J}[i-1]\hat{H}[\mathcal{K}_{1(2i-1)}]X$$
$$[\mathcal{K}_{1(2i-1)}] - \hat{J}[-(i-1)]\hat{H}[\mathcal{K}_{(2i-1)1}]X[\mathcal{K}_{(2i-1)1}],$$
for $i>1$ wherein:

$\mathcal{K}_{ij} = \{k_{1(i+1)}, \ldots, k_{1(N_{PTRS}-j)}, \ldots, k_{N_c(i+1)}, \ldots, k_{N_{PTRS}-j}\}$, wherein $k_{pq}$ is the q-th subcarrier of the p-th group of subcarriers of the phase tracking reference signal subcarriers; $\hat{H}[\mathcal{K}_{ij}]$ is a diagonal matrix the p-th diagonal element of which is equal to the estimated channel response for the p-th subcarrier from among the set $\mathcal{K}_{ij}$; $X[\mathcal{K}_{pq}]$ is the transmitted signal in subcarriers from among the set $\mathcal{K}_{pq}$; $Y[\mathcal{K}_{ij}]$ is the received signal in subcarriers from among the set $\mathcal{K}_{ij}$; $\hat{J}[0]$ is the estimated common phase error; and $\hat{J}[p]$, for p not equal to zero, is the estimated p-th inter-carrier interference term.

In one embodiment, the estimating, based on the i-th compensated received signal, of the i-th inter-carrier interference term includes calculating the i-th estimated inter-carrier interference term Ĵ[i] according to $$\begin{bmatrix} \text{Re}\{\hat{J}[i]\} \\ \text{Im}\{\hat{J}[i]\} \end{bmatrix}_{2\times 1} = (T^H T)^{-1} T^H \begin{bmatrix} \text{Re}\{Y_{SIC}[\kappa_{ii}]\} \\ \text{Im}\{Y_{SIC}[\kappa_{ii}]\} \end{bmatrix}_{2(N_c(N_{PTRS}-2i))\times 1},$$

wherein: $T = \begin{bmatrix} A_{(N_c(N_{PTRS}-2i))\times 1} & B_{(N_c(N_{PTRS}-2i))\times 1} \\ C_{(N_c(N_{PTRS}-2i))\times 1} & D_{(N_c(N_{PTRS}-2i))\times 1} \end{bmatrix}_{2(N_c(N_{PTRS}-2i))\times 2}$;

$A = \text{Re}\{\hat{H}[\kappa_{0(2i)}]X[\kappa_{0(2i)}]\} - \text{Re}\{\hat{H}[\kappa_{(2i)0}]X[\kappa_{(2i)0}]\}$;

$B = -\text{Im}\{\hat{H}[\kappa_{0(2i)}]X[\kappa_{0(2i)}]\} - \text{Im}\{\hat{H}[\kappa_{(2i)0}]X[\kappa_{(2i)0}]\}$;

$C = \text{Im}\{\hat{H}[\kappa_{0(2i)}]X[\kappa_{0(2i)}]\} - \text{Im}\{\hat{H}[\kappa_{(2i)0}]X[\kappa_{(2i)0}]\}$; and $D = \text{Re}\{\hat{H}[\kappa_{0(2i)}]X[\kappa_{0(2i)}]\} + \text{Re}\{\hat{H}[\kappa_{(2i)0}]X[\kappa_{(2i)0}]\}$.

In one embodiment, the method further includes calculating a final compensated received signal $Y_{ICI\ comp}[l]$ based on a matched filter, wherein an order of the filter is dependent on a number of estimated inter-carrier interference terms.

According to an embodiment of the present disclosure there is provided a method, including: estimating a channel using demodulation reference signal subcarriers from a received signal; estimating a common phase error term using the estimated channel and phase tracking reference signal subcarriers; and estimating one or more inter-carrier interference terms, including: canceling, from the received signal, the estimated common phase error term to form a first compensated received signal; and jointly estimating, based on the first compensated received signal, L inter-carrier interference terms, L being a set integer greater than 0.

In one embodiment, the method further includes calculating a value of the transmitted signal in a subcarrier using known PTRS pilots.

In one embodiment, the estimating of the common phase error includes calculating a phase of the estimated common phase error according to $\angle \hat{J}[0] = \angle((H[\kappa]X[\kappa])^H Y[\kappa])$, wherein: $\kappa$ is a set of phase tracking reference signal subcarriers; $\hat{H}[\kappa]$ is a diagonal matrix the p-th diagonal element of which is equal to the estimated channel response for the p-th subcarrier from among the set $\kappa$; $X[\kappa]$ is the transmitted signal in subcarriers from among the set $\kappa$; $Y[\kappa]$ is the received signal in subcarriers from among the set $\kappa$; and H as a superscript denotes a conjugate transpose.

In one embodiment, the estimating of the common phase error further includes setting an amplitude of the common phase error to be equal to 1.

In one embodiment, the phase tracking reference signal subcarriers include $N_c N_{PTRS}$ subcarriers, arranged in $N_c$ groups, each of the $N_c$ groups including $N_{PTRS}$ adjacent subcarriers.

In one embodiment, the canceling, from the received signal, the estimated common phase error to form a first compensated received signal includes calculating the first compensated received signal $Y_{CPEcomp}[\kappa_{LL}]$ according to $Y_{CPEcomp}[\kappa_{LL}] = Y[\kappa_{LL}] - \hat{J}[0]\hat{H}[\kappa_{LL}]X[\kappa_{LL}]$ wherein: $\kappa_{ij} = \{k_{1(i+1)}, \ldots, k_{1(N_{PTRS}-j)}, \ldots, k_{N_c(i+1)}, \ldots, k_{N_{PTRS}-j}\}$ wherein $k_{pq}$ is the q-th subcarrier of the p-th group of subcarriers of the phase tracking reference signal subcarriers; $\hat{H}[\kappa_{LL}]$ is a diagonal matrix the p-th diagonal element of which is equal to the estimated channel response for the p-th sub carrier from among the set $\kappa_{LL}$; $X[\kappa_{LL}]$ is the transmitted signal in subcarriers from among the set $\kappa_{LL}$; $Y[\kappa_{LL}]$ is the received signal in subcarriers from among the set $\kappa_{LL}$; and $\hat{J}[0]$ is the estimated common phase error.

In one embodiment, the jointly estimating, based on the first compensated received signal, of L inter-carrier interference terms, includes calculating the L estimated inter-carrier interference terms Ĵ according to $$\begin{bmatrix} \text{Re}\{\hat{J}\} \\ \text{Im}\{\hat{J}\} \end{bmatrix}_{2L\times 1} = (T^H T)^{-1} T^H \begin{bmatrix} \text{Re}\{Y_{CPEcomp}[\kappa_{LL}]\} \\ \text{Im}\{Y_{CPEcomp}[\kappa_{LL}]\} \end{bmatrix}_{2(N_c(N_{PTRS}-2L))\times 1},$$

wherein:

$T = \begin{bmatrix} A_{(N_c(N_{PTRS}-2L))\times L} & B_{(N_c(N_{PTRS}-2L))\times L} \\ C_{(N_c(N_{PTRS}-2L))\times L} & D_{(N_c(N_{PTRS}-2L))\times L} \end{bmatrix}_{2(N_c(N_{PTRS}-2L))\times 2L}$;

and the respective i-th columns $A_i$, $B_i$, $C_i$, and $D_i$ of A, B, C, and D are:

$A_i = \text{Re}\{\hat{H}[\kappa_{(L-1)(L+1)}]X[\kappa_{(L-1)(L+1)}]\} - \text{Re}\{\hat{H}[\kappa_{(L+1)(L-1)}]X[\kappa_{(L+1)(L-1)}]\}$;

$B_i = -\text{Im}\{\hat{H}[\kappa_{(L-1)(L+1)}]X[\kappa_{(L-1)(L+1)}]\} - \text{Im}\{\hat{H}[\kappa_{(L+1)(L-1)}]X[\kappa_{(L+1)(L-1)}]\}$;

$C_i = \text{Im}\{\hat{H}[\kappa_{(L-1)(L+1)}]X[\kappa_{(L-1)(L+1)}]\} - \text{Im}\{\hat{H}[\kappa_{(L+1)(L-1)}]X[\kappa_{(L+1)(L-1)}]\}$; and $D_i = \text{Re}\{\hat{H}[\kappa_{(L-1)(L+1)}]X[\kappa_{(L-1)(L+1)}]\} + \text{Re}\{\hat{H}[\kappa_{(L+1)(L-1)}]X[\kappa_{(L+1)(L-1)}]\}$.

In one embodiment, the method further includes calculating a final compensated received signal $Y_{ICI\_comp}[l]$ according to $Y_{ICI\_comp}[l] = \hat{J}^*[0]Y[l] + \hat{J}^*[1]Y[l+1] + \hat{J}^*[-1]Y[l-1] + \ldots + \hat{J}^*[L]Y[l+L] + \hat{J}^*[-L]Y[l-L]$.

According to an embodiment of the present disclosure there is provided a plurality of phase tracking reference signal subcarriers, the method including transmitting the orthogonal frequency-division multiplexed signal, wherein the phase tracking reference signal subcarriers are in a plurality of subcarriers, arranged in $N_c$ groups, each of the $N_c$ groups including a plurality of adjacent subcarriers.

In one embodiment, each group includes exactly $N_{PTRS}$ adjacent phase tracking reference signal subcarriers, $N_{PTRS}$ being an integer greater than 0.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
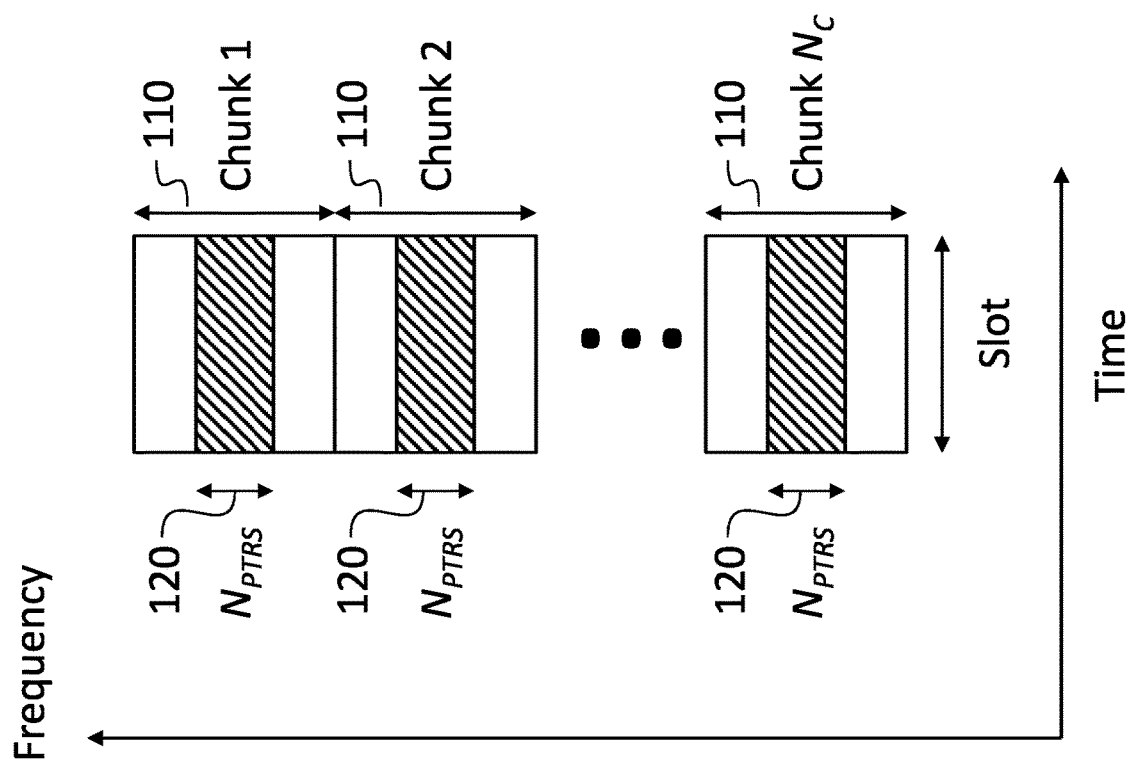
FIG. 1A is a time-frequency diagram of a phase tracking reference signal structure, according to an embodiment of the present disclosure.

The detailed description set forth below in connection with the appended drawings is intended as a description of exemplary embodiments of a system and method for common phase error and inter-carrier interference estimation and compensation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

An OFDM transmission structure may include a plurality of uniformly spaced subcarriers, e.g., 1024 subcarriers, separated by 15 kHz from each other. Of these subcarriers, a subset, e.g., 600 subcarriers, may be used to transmit data and PTRS subcarriers; this subset may be referred to as the resource block (RB) allocation. The remainder of the subcarriers may be reserved for other purposes such as guard bands. Each subcarrier may be numbered with an index. For example, the subcarriers may be given consecutive numbers beginning with 1 for the lowest-frequency subcarrier or beginning with 1 for the highest-frequency subcarrier in the resource block allocation. The center of the frequency range spanned by the plurality of subcarriers may be at microwave or millimeter-wave frequencies, e.g., at 40 GHz or at 60 GHz. Each subcarrier may be independently modulated, e.g., using 8×8 quadrature amplitude modulation (64 QAM) for data subcarriers, and using quadrature phase shift keying (QPSK) modulation for the PTRS subcarriers. Each subcarrier may transmit a stream of symbols (each corresponding to an interval of time). The length of the symbol interval may be selected to be the reciprocal of the spacing between subcarriers (e.g., the symbol interval may be selected to be $\frac{1}{15,000}$ seconds) so that each of the subcarriers is orthogonal to all of the other subcarriers during each symbol interval. The New Radio standard uses OFDM.

The frequency domain received signal in the presence of phase noise in each OFDM symbol may be represented as:

$$Y[l] = \sum_{k=0}^{N-1} H[k]X[k]J[l-k] + Z[l] \quad (1)$$

$$= H[l]X[l]J[0] + \underbrace{\sum_{k=0, k \neq l}^{N-1} H[k]X[k]J[l-k]}_{ICI} + Z[l]$$

where $$J[k] = \frac{1}{N}\sum_{n=0}^{N-1} e^{j\theta_n} e^{-j2\pi kn/N}, \quad (2)$$

Y[l] is the received signal at subcarrier l,
X[k] is the transmitted signal at subcarrier k,
Z[l] is white Gaussian noise,
H[k] is the channel at subcarrier k,
J[k] is the k-th term of inter-carrier interference,
N is the FFT size, and
$\theta_n$ is the phase noise realization at time sample n.

In equation 1, J[0] is the common phase error, and, as shown in Equation 1, J[l-k] is inter-carrier interference. The channel at subcarrier k, (i.e., the transfer function of the channel, at the center frequency of subcarrier k) may be estimated using a demodulation reference signal (DMRS) that may be transmitted along with data and the PTRS subcarriers.

Figure 1B:
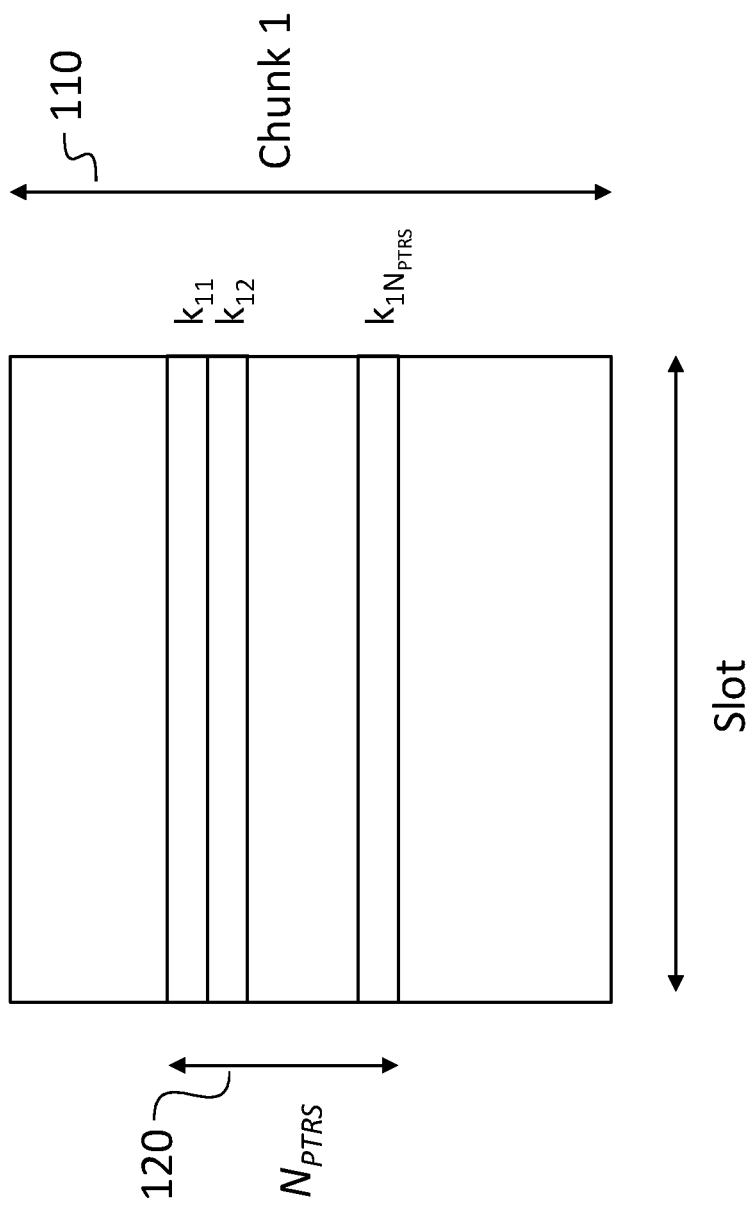
FIG. 1B is a time-frequency diagram of a phase tracking reference signal structure, according to an embodiment of the present disclosure.

If $\theta_n$ is small, the following property may hold for inter-carrier interference terms: $J[k] = -J^*[-k]$ The PTRS structure, i.e., the set of subcarriers used to transmit the PTRS signals, may affect the ability of a receiver to perform interference cancellation, e.g., in particular, the ability of a receiver to compensate for inter-carrier interference. Accordingly, in some embodiments a group distributed structure is used. This structure is shown in FIGS. 1A and 1B, in one embodiment. The subcarriers within the resource block allocation are grouped into $N_c$ groups of adjacent subcarriers; these groups may be referred to as "chunks". Each chunk includes $N_{PTRS}$ adjacent PTRS subcarriers. FIG. 1A is a time-frequency diagram of a phase tracking reference signal structure, according to an embodiment of the present disclosure. FIG. 1A shows the grouping of subcarriers into chunks 110 and the allocation, within each chunk, to PTRS signals, of a set 120 of $N_{PTRS}$ adjacent subcarriers. The set of indexes of these carriers may be given by:

$$K = \{k_{11}, \ldots, k_{1N_{PTRS}}, \ldots, k_{N_c1}, \ldots, k_{N_cN_{PTRS}}\}$$

where $k_{pq}$ is the q-th subcarrier of the p-th group of subcarriers of the PTRS subcarriers. FIG. 1B is a time-frequency diagram of a phase tracking reference signal structure, according to an embodiment of the present disclosure. FIG. 1B shows this numbering convention for the set 120 of PTRS subcarriers in one of the chunks 110, chunk 1.

When the transmitted data include a group distributed PTRS structure, inter-carrier interference estimation and common phase error estimation and compensation may be performed according to two alternate methods, one of which is referred to herein as successive interference cancellation (SIC) and the other of which is referred to as joint estimation of inter-carrier interference.

Figure 2:
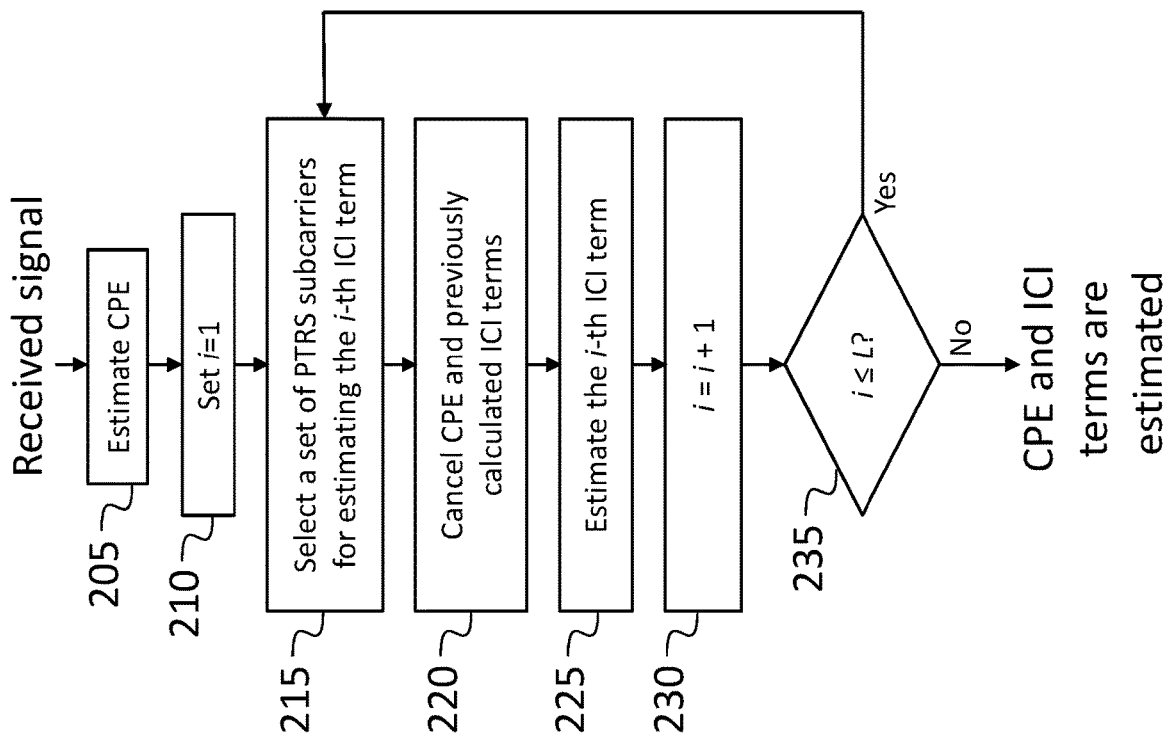
FIG. 2 is a flowchart of a method for estimating common phase error and inter-carrier interference, according to an embodiment of the present disclosure.

FIG. 2 is a flowchart of a method for estimating common phase error and inter-carrier interference, according to an embodiment of the present disclosure. Referring to FIG. 2, to perform inter-carrier interference estimation and common phase error estimation and compensation using successive interference cancellation, the following approach may be used. In general, the common phase error J[0] may not be precisely unit amplitude, but when the noise samples are small, the amplitude of J[0] may be approximately 1. Accordingly, the estimate $\hat{J}[0]$ of the common phase error may be written:

$$\hat{J}[0] = e^{j\angle J[0]},$$

and its estimated phase may be calculated, at 205, according to:

$$\angle \hat{J}[0] = \angle ((\hat{H}[\boldsymbol{\kappa}]X[\boldsymbol{\kappa}])^H Y[\boldsymbol{\kappa}])$$

where $\boldsymbol{\kappa}$ is the set of phase tracking reference signal subcarriers, $H[\kappa]$ is a diagonal matrix the p-th diagonal element of which is equal to the estimated channel response for the p-th subcarrier from among the set $\kappa$, $X[\kappa]$ is the transmitted signal in subcarriers from among the set $\kappa$, $Y[\kappa]$ is the received signal in subcarriers from among the set $\kappa$, and H as a superscript denotes a conjugate transpose.

Next, a set of L inter-carrier interference terms may be iteratively estimated, in a loop including 210 through 235. The value of L providing acceptable performance may depend on $N_{PTRS}$, on $N_c$, and on the phase noise characteristics. L may be selected offline (e.g., using simulations to identify a value that provides good performance that is relatively insensitive to the phase noise characteristics) and stored in a buffer. At 210, the loop index i is initialized to 1. At 215, a set of PTRS subcarriers suitable for estimating the i-th inter-carrier interference term is selected. This may be done by defining the following set:

$$\boldsymbol{\kappa}_{ij} = \{k_{1(i+1)}, \ldots, k_{1(N_{PTRS}-j)}, \ldots, k_{N_c(i+1)}, \ldots, k_{N_{PTRS}-j)}\}$$

and selecting the set $\kappa_{ii}$ as the set of PTRS subcarriers to be used for estimating i-th inter-carrier interference term.

At 220, the estimated common phase error, and the first through (i−1)-th inter-carrier interference terms may be canceled from the received signal according to:

$$Y_{SIC}[\boldsymbol{\kappa}_{ii}] = Y[\boldsymbol{\kappa}_{ii}] - \hat{J}[0]\hat{H}[\boldsymbol{\kappa}_{ii}]X[\boldsymbol{\kappa}_{ii}], \text{ for } i=1,$$

and $$[\boldsymbol{\kappa}_{ii}] = Y[\boldsymbol{\kappa}_{ii}] - \hat{J}[0]\hat{H}[\boldsymbol{\kappa}_{ii}]X[\boldsymbol{\kappa}_{ii}] - \hat{J}[1]$$
$$\hat{H}[\boldsymbol{\kappa}_{(i-1)(i+1)}]X[\boldsymbol{\kappa}_{(i-1)(i+1)}] - \hat{J}[-1]$$
$$\hat{H}[\boldsymbol{\kappa}_{(i+1)(i-1)}]X[\boldsymbol{\kappa}_{(i+1)(i-1)}] - \ldots - \hat{J}[i-1]$$
$$\hat{H}[\boldsymbol{\kappa}_{1(2i-1)}]X[\boldsymbol{\kappa}_{1(2i-1)}] - \hat{J}[-(i-1)]\hat{H}[\boldsymbol{\kappa}_{(2i-1)1}]$$
$$X[\boldsymbol{\kappa}_{(2i-1)1}], \text{for } i>1$$

where $\boldsymbol{\kappa}_{ij} = \{k_{1(i+1)}, \ldots, k_{1(N_{PTRS}-j)}, \ldots, k_{N_c(i+1)}, \ldots, k_{N_{PTRS}-j)}\}$, wherein $k_{pq}$ is the q-th subcarrier of the p-th group of subcarriers of the phase tracking reference signal subcarriers), $\hat{H}[\boldsymbol{\kappa}_{ij}]$ is a diagonal matrix the p-th diagonal element of which is equal to the estimated channel response for the p-th subcarrier from among the set $\boldsymbol{\kappa}_{ij}$, $X[\boldsymbol{\kappa}_{pq}]$ is the transmitted signal in subcarriers from among the set $\boldsymbol{\kappa}_{pq}$, $Y[\boldsymbol{\kappa}_{ii}]$ is the received signal in subcarriers from among the set $\boldsymbol{\kappa}_{ii}$, $\hat{J}[0]$ is the estimated common phase error, and $\hat{J}[p]$, for p not equal to zero, is the estimated p-th inter-carrier interference term.

The result, $Y_{SIC}[\boldsymbol{\kappa}_{ii}]$, may be referred to as the i-th compensated received signal.

The next (i-th) inter-carrier interference term may then be estimated, at 225, based on the i-th compensated received signal, according to:

$$\begin{bmatrix} \text{Re}\{\hat{J}[i]\} \\ \text{Im}\{\hat{J}[i]\} \end{bmatrix}_{2\times 1} = (T^H T)^{-1} T^H \begin{bmatrix} \text{Re}\{Y_{SIC}[\kappa_{ii}]\} \\ \text{Im}\{Y_{SIC}[\kappa_{ii}]\} \end{bmatrix}_{2(N_c(N_{PTRS}-2i))\times 1},$$

where $$T = \begin{bmatrix} A_{(N_c(N_{PTRS}-2i))\times 1} & B_{(N_c(N_{PTRS}-2i))\times 1} \\ C_{(N_c(N_{PTRS}-2i))\times 1} & D_{(N_c(N_{PTRS}-2i))\times 1} \end{bmatrix}_{2(N_c(N_{PTRS}-2i))\times 2},$$

$A = \text{Re}\{\hat{H}[\kappa_{0(2i)}]X[\kappa_{0(2i)}]\} - \text{Re}\{\hat{H}[\kappa_{(2i)0}]X[\kappa_{(2i)0}]\}$, $B = -\text{Im}\{\hat{H}[\kappa_{0(2i)}]X[\kappa_{0(2i)}]\} - \text{Im}\{\hat{H}[\kappa_{(2i)0}]X[\kappa_{(2i)0}]\}$;

$C = \text{Im}\{\hat{H}[\kappa_{0(2i)}]X[\kappa_{0(2i)}]\} - \text{Im}\{\hat{H}[\kappa_{(2i)0}]X[\kappa_{(2i)0}]\}$, and $D = \text{Re}\{\hat{H}[\kappa_{0(2i)}]X[\kappa_{0(2i)}]\} + \text{Re}\{\hat{H}[\kappa_{(2i)0}]X[\kappa_{(2i)0}]\}$.

The index i may then be incremented (at 230) and compared to the loop limit L (at 235), and the loop may repeat until i exceeds L.

The estimated common phase error and inter-carrier interference terms may then be used to calculate a final compensated received signal $Y_{ICI\ comp}[l]$ according to:

$$Y_{ICI\ comp}[l] = \hat{J}^*[0]Y[l] + \hat{J}^*[1]Y[l+1] + \hat{J}^*[-1]$$
$$Y[l-1] + \ldots + \hat{J}^*[L]Y[l+L] + \hat{J}^*[-L]Y[l-L].$$

The above expression may be seen to be a finite impulse response (FIR) filter.

Figure 3:
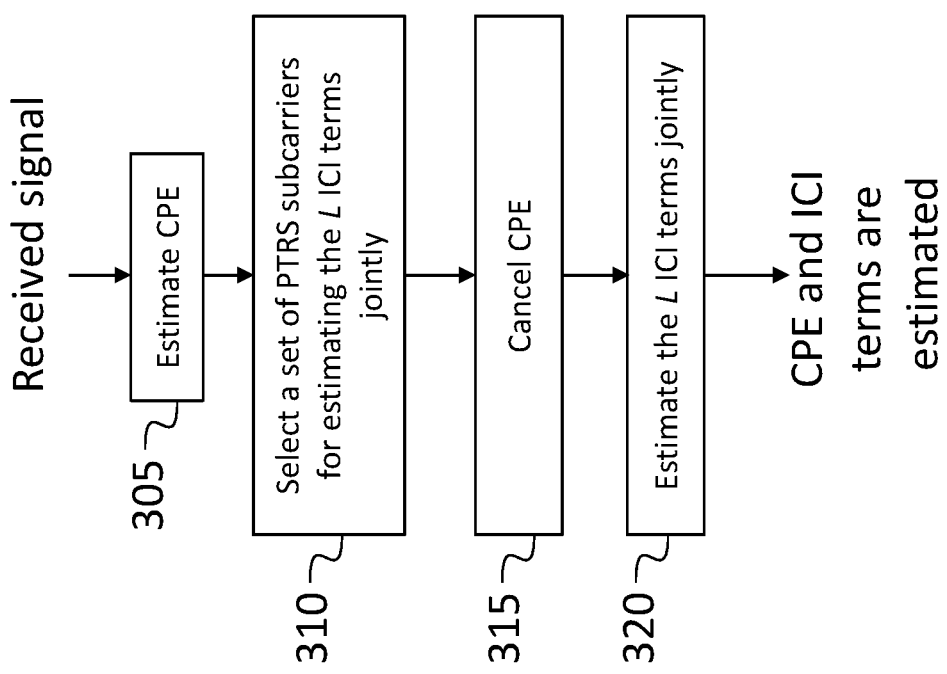
FIG. 3 is a flowchart of a method for estimating common phase error and inter-carrier interference, according to an embodiment of the present disclosure.

FIG. 3 is a flowchart of a method for estimating common phase error and inter-carrier interference, according to an embodiment of the present disclosure. Referring to FIG. 3, to perform inter-carrier interference estimation and common phase error estimation and compensation using joint estimation of inter-carrier interference, the following approach may be used. The estimate j[0] of the common phase error may be calculated, at 305, in the same manner as described above, for the case of inter-carrier interference estimation and common phase error estimation and compensation using successive interference cancellation, i.e., writing $$\hat{J}[0] = e^{j\angle J[0]}$$

and calculating the estimated phase according to:

$$\angle \hat{J}[0] = \angle ((\hat{H}[\boldsymbol{\kappa}]X[\boldsymbol{\kappa}])^H Y[\boldsymbol{\kappa}]).$$

At 310, a set of PTRS subcarriers suitable for jointly estimating the L inter-carrier interference terms is selected. This may be done by selecting the set $\boldsymbol{\kappa}_{LL}$ as the set of PTRS subcarriers to be used for jointly estimating the L inter-carrier interference terms. At 315, the common phase error may then be canceled according to $$Y_{CPEcomp}[\boldsymbol{\kappa}_{LL}] = Y[\boldsymbol{\kappa}_{LL}] - \hat{J}[0]\hat{H}[\boldsymbol{\kappa}_{LL}]X[\boldsymbol{\kappa}_{LL}]$$

where $\boldsymbol{\kappa}_{ij} = \{k_{1(i+1)}, \ldots, k_{1(N_{PTRS}-j)}, \ldots, k_{N_c(i+1)}, \ldots, k_{N_{PTRS}-j)}\}$ (where $k_{pq}$ is the q-th subcarrier of the $p^{th}$ group of subcarriers of the phase tracking reference signal subcarriers), $\hat{H}[\boldsymbol{\kappa}_{LL}]$ is a diagonal matrix the $p^{th}$ diagonal element of which is equal to the estimated channel response for the $p^t$ subcarrier from among the set $\boldsymbol{\kappa}_{LL}$, $X[\boldsymbol{\kappa}_{LL}]$ is the transmitted signal in subcarriers from among the set $\boldsymbol{\kappa}_{LL}$, $Y[\boldsymbol{\kappa}_{LL}]$ is the received signal in subcarriers from among the set $\boldsymbol{\kappa}_{LL}$, and $\hat{J}[0]$ is the estimated common phase error.

Figure 4A:
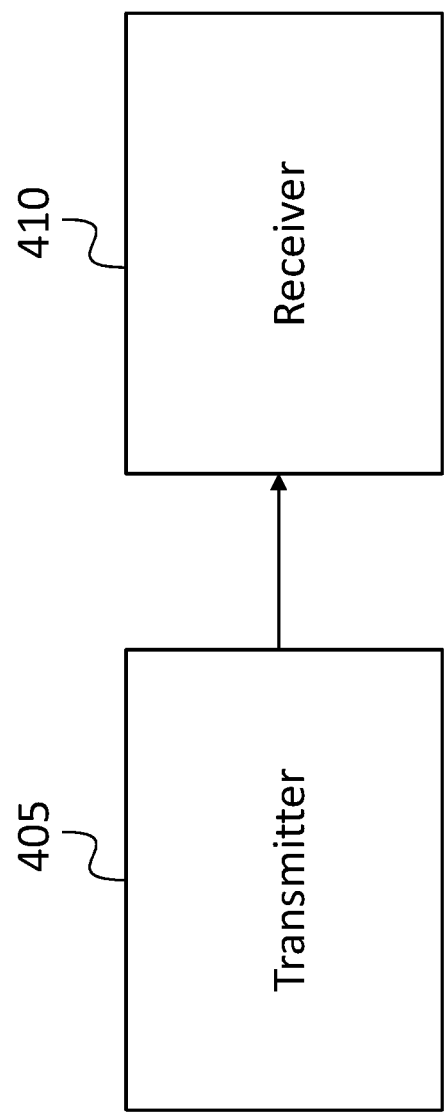
FIG. 4A is a block diagram of a transmitter and a receiver, according to an embodiment of the present disclosure.
Figure 4B:
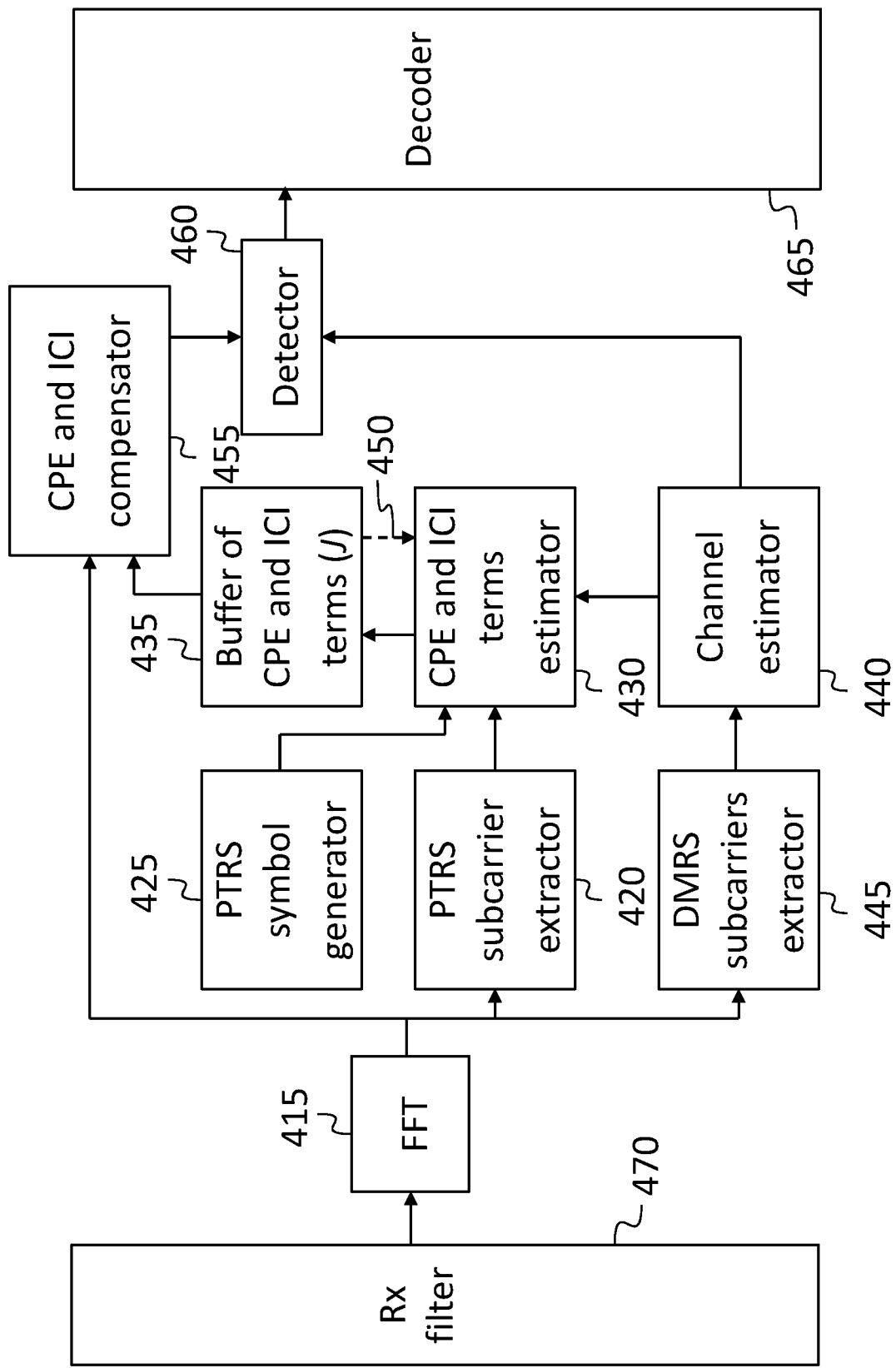
FIG. 4B is a block diagram of a system for estimating, and compensating for, common phase error and inter-carrier interference, according to an embodiment of the present disclosure.

At 320, the L inter-carrier interference terms may then be estimated jointly according to $$\begin{bmatrix} \text{Re}\{\hat{J}\} \\ \text{Im}\{\hat{J}\} \end{bmatrix}_{2L \times 1} = (T^H T)^{-1} T^H \begin{bmatrix} \text{Re}\{Y_{CPEcomp}[K_{LL}]\} \\ \text{Im}\{Y_{CPEcomp}[K_{LL}]\} \end{bmatrix}_{2(N_c(N_{PTRS}-2L)) \times 1},$$

where $$T = \begin{bmatrix} A_{(N_c(N_{PTRS}-2L)) \times L} & B_{(N_c(N_{PTRS}-2L)) \times L} \\ C_{(N_c(N_{PTRS}-2L)) \times L} & D_{(N_c(N_{PTRS}-2L)) \times L} \end{bmatrix}_{2(N_c(N_{PTRS}-2L)) \times 2L},$$

and the respective i-th columns $A_i$, $B_i$, $C_i$, and $D_i$ of A, B, C, and D are:

$A_i = \text{Re}\{\hat{H}[\mathcal{K}_{(L-1)(L+1)}]X[\mathcal{K}_{(L-1)(L+1)}]\} - \text{Re}\{\hat{H}[\mathcal{K}_{(L+1)(L-1)}]X[\mathcal{K}_{(L+1)(L-1)}]\};$ $B_i = -\text{Im}\{\hat{H}[\mathcal{K}_{(L-1)(L+1)}]X[\mathcal{K}_{(L-1)(L+1)}]\} - \text{Im}\{\hat{H}[\mathcal{K}_{(L+1)(L-1)}]X[\mathcal{K}_{(L+1)(L-1)}]\};$ $C_i = \text{Im}\{\hat{H}[\mathcal{K}_{(L-1)(L+1)}]X[\mathcal{K}_{(L-1)(L+1)}]\} - \text{Im}\{\hat{H}[\mathcal{K}_{(L+1)(L-1)}]X[\mathcal{K}_{(L+1)(L-1)}]\};$ and $D_i = \text{Re}\{\hat{H}[\mathcal{K}_{(L-1)(L+1)}]X[\mathcal{K}_{(L-1)(L+1)}]\} + \text{Re}\{\hat{H}[\mathcal{K}_{(L+1)(L-1)}]X[\mathcal{K}_{(L+1)(L-1)}]\}.$ The estimated common phase error and inter-carrier interference terms may then be used to calculate, in the same manner as described above (for the case of inter-carrier interference estimation and common phase error estimation and compensation using successive interference cancellation) a final compensated received signal $Y_{ICI\ comp}[l]$, i.e., according to $Y_{ICI\ comp}[l] = \hat{J}^*[0]Y[l] + \hat{J}^*[1]Y[l+1] + \hat{J}^*[-1]Y[l-1] + \ldots + \hat{J}^*[L]Y[l+L] + \hat{J}^*[-L]Y[l-L].$ FIG. 4A is a block diagram of a transmitter 405 and a receiver 410, according to an embodiment of the present disclosure. FIG. 4A shows a block diagram of a transmitter (which may transmit a PTRS structure according to an embodiment of the present disclosure) and a receiver (which may employ a system and method, according to an embodiment of the present disclosure, for estimating, and compensating for, both common phase error, and inter-carrier interference). FIG. 4B is a block diagram of a system for estimating, and compensating for, common phase error and inter-carrier interference, according to an embodiment of the present disclosure. FIG. 4B shows a block diagram for two embodiments, one of which employs successive interference cancellation (SIC) and the other of which employs joint estimation of inter-carrier interference. PTRS subcarriers are extracted from a frequency-domain signal (the output of the FFT 415) by a PTRS subcarrier extractor 420, and the transmitted PTRS signal (X[$\mathcal{K}_{pq}$]) is generated in the PTRS symbol generator 425 using the known PTRS pilots. Common phase error and inter-carrier interference terms are estimated by the CPE and ICI terms estimator 430 and buffered in the buffer 435 of CPE and ICI terms. The CPE and ICI terms estimator receives the estimated channel response ($\hat{H}[k]$) from the channel estimator 440, which estimates the response of each channel using demodulation reference signals (DMRSs) received from the DMRS subcarriers extractor 445. The dashed arrow 450, indicating a flow of information from the buffer of CPE and ICI terms back to the CPE and ICI terms estimator, is used (i.e., the information flow is present) in the embodiment employing successive interference cancellation and absent from the embodiment employing joint estimation of inter-carrier interference. Once the common phase error and inter-carrier interference terms have been estimated, the final compensated received signal $Y_{ICI\ comp}[l]$ is calculated by the CPE and ICI compensator 455, the output of which is fed (along with the output of the channel estimator) to the detector 460 (the output of which is fed to the decoder 465). Each of the blocks in FIG. 4B, except the Rx (receive) filter 470, may be a separate processing circuit (discussed in further detail below), or each of these blocks may (equivalently) be implemented as a separate portion of a single processing circuit, or some or all of them may be implemented in hardware or firmware executed by a processing circuit that is configured to operate as a stored-program computer.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Each of FIGS. 5-8 is a graph of simulated performance, according to an embodiment of the present disclosure. FIGS. 5-8 show simulated performance for various embodiments. The simulations illustrate that significant improvements in performance are possible, using common phase error and inter-carrier interference compensation according to embodiments of the present disclosure.

Figure 5:
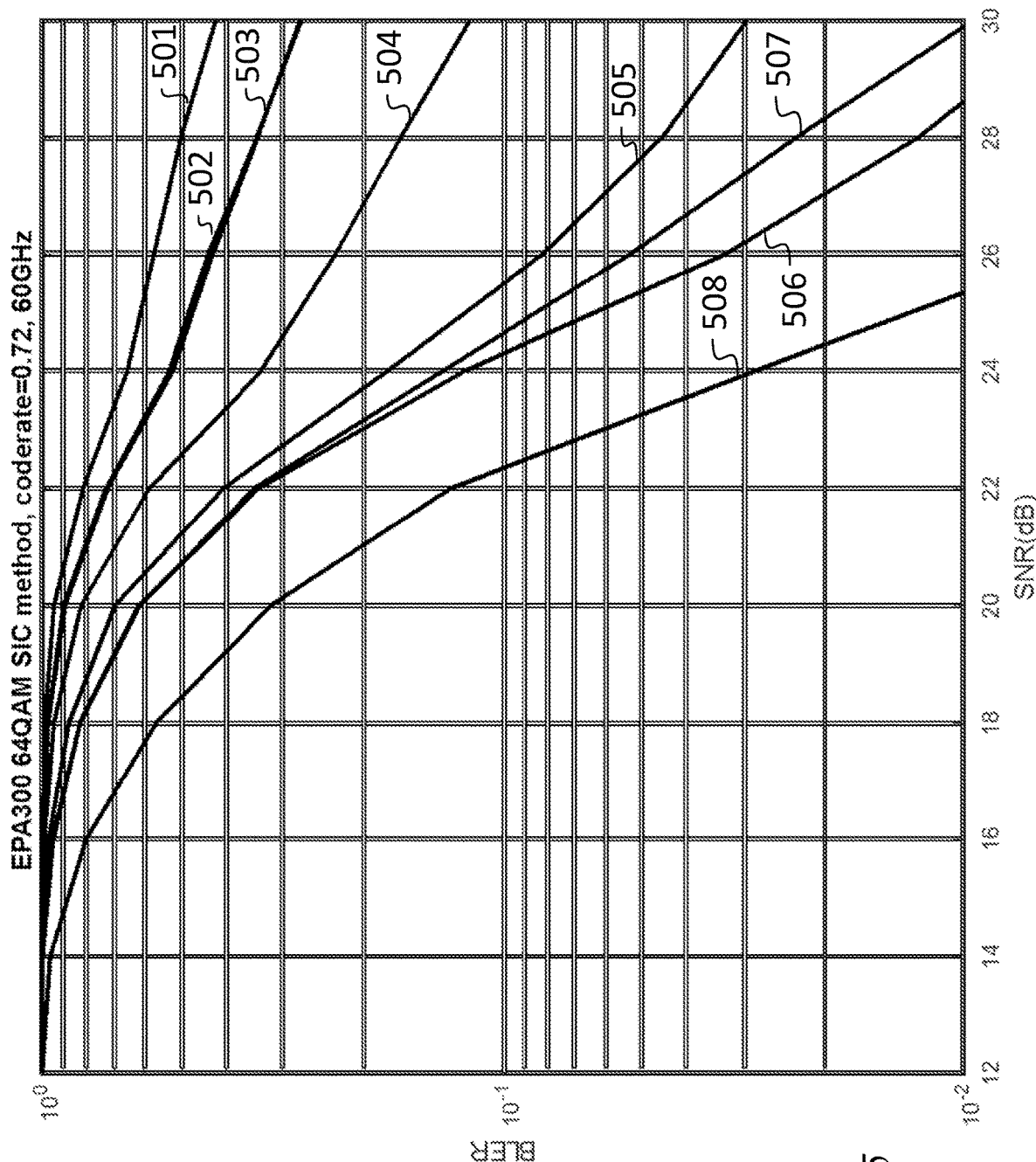
FIG. 5 is a graph of simulated performance, according to an embodiment of the present disclosure.
Figure 6:
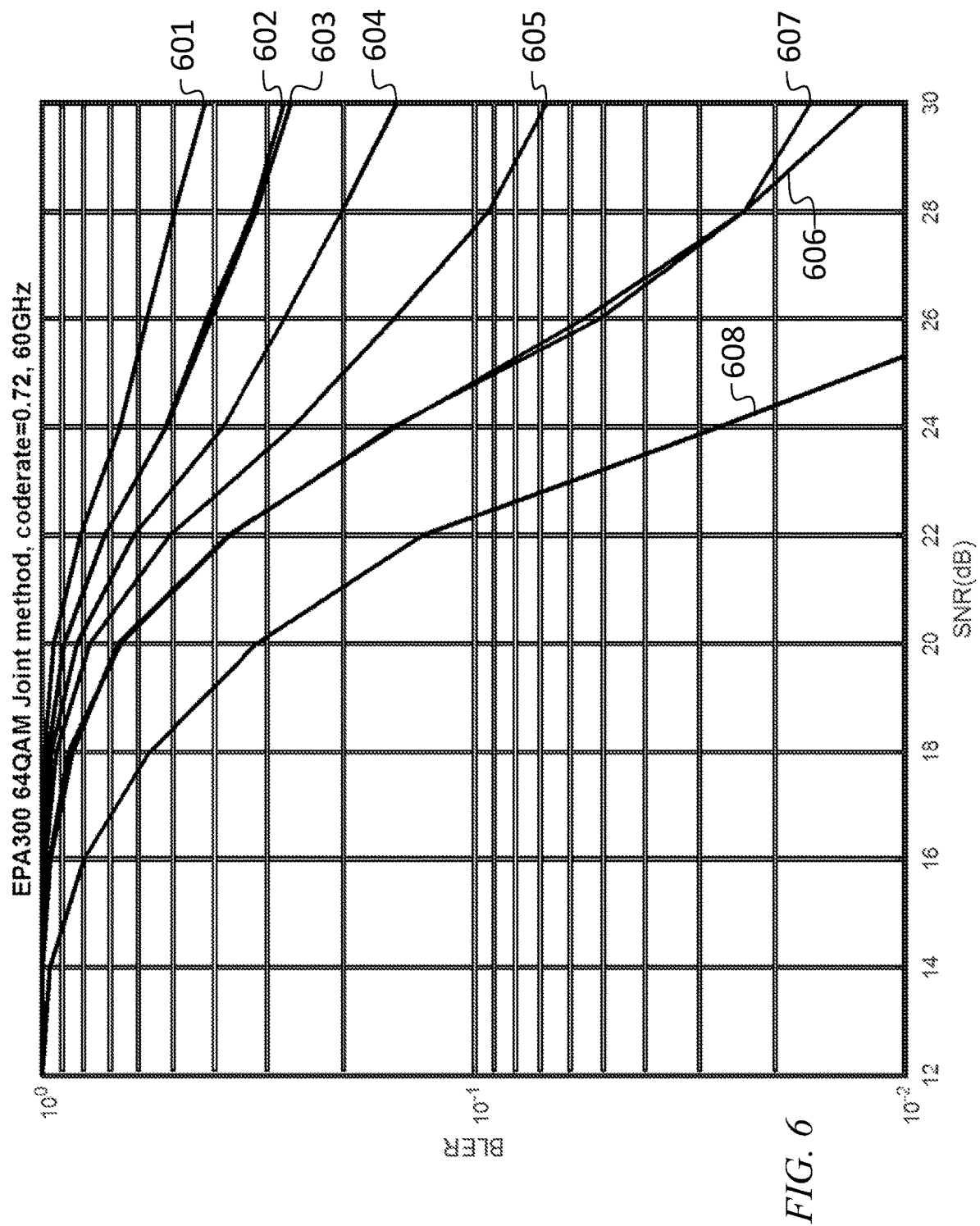
FIG. 6 is a graph of simulated performance, according to an embodiment of the present disclosure.
Figure 7:
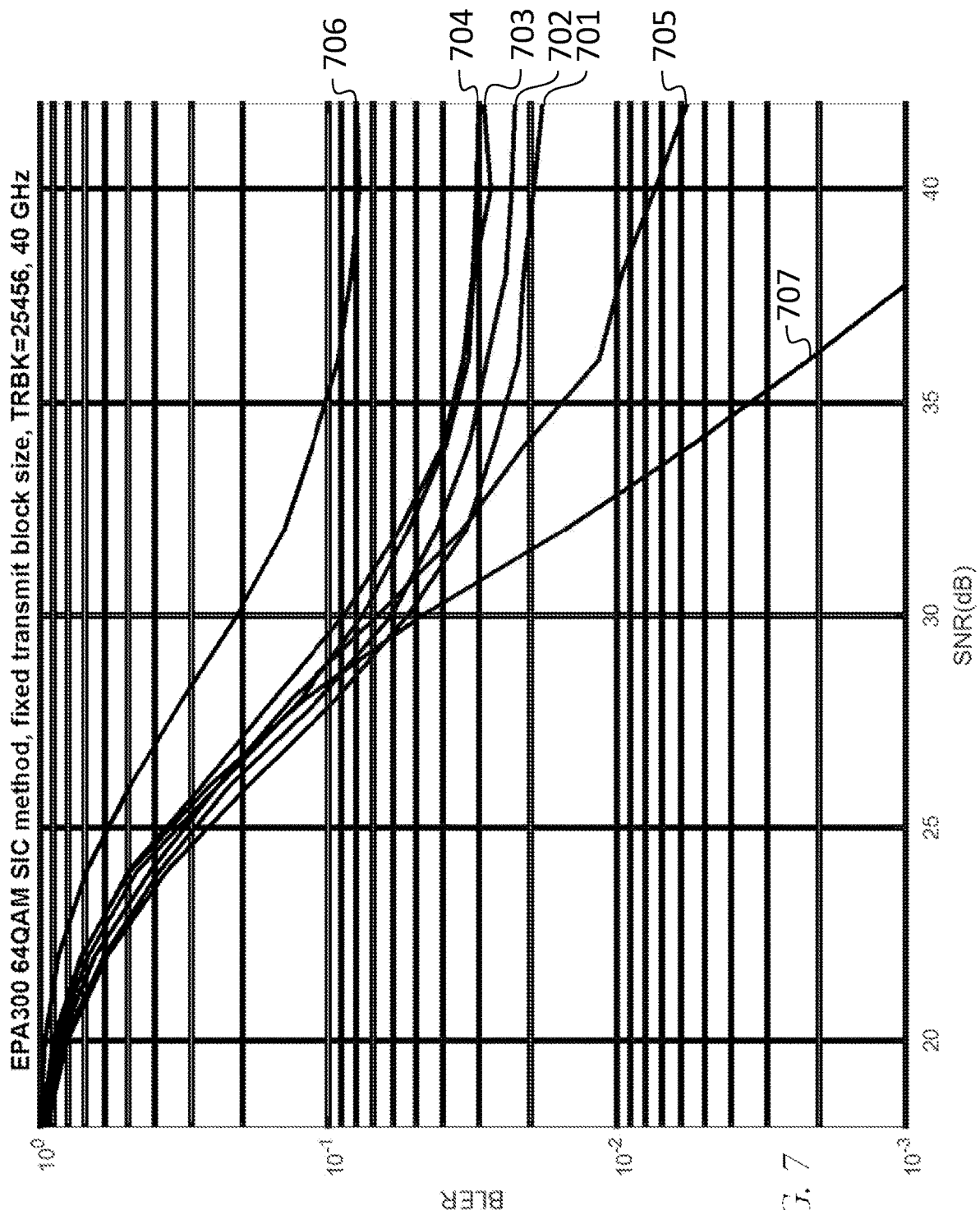
FIG. 7 is a graph of simulated performance, according to an embodiment of the present disclosure.
Figure 8:
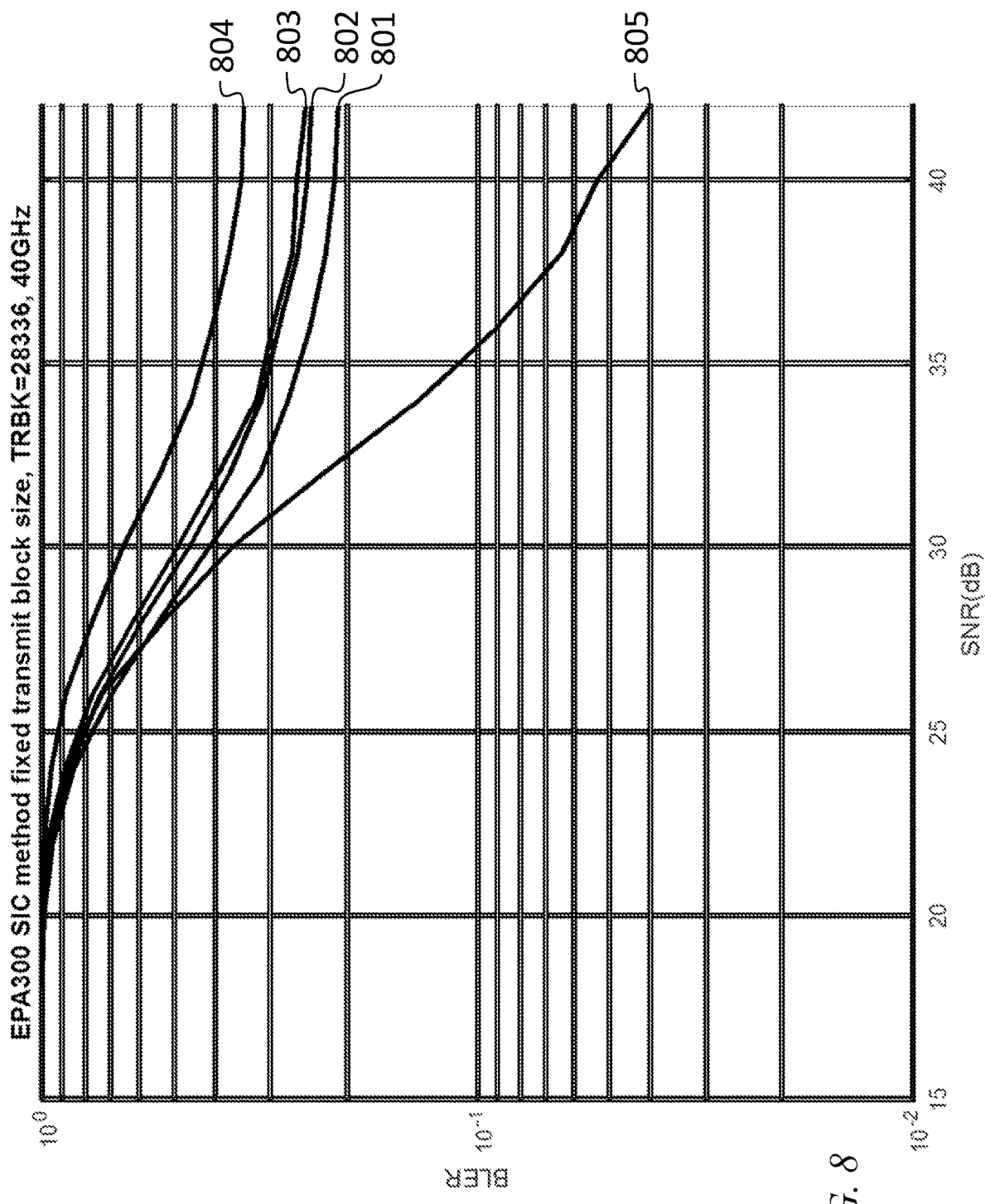
FIG. 8 is a graph of simulated performance, according to an embodiment of the present disclosure.

FIGS. 5 and 6 use simulations in which the effective code rate is fixed, and FIGS. 7 and 8 use simulations in which the transmit block size is fixed. FIGS. 5 and 7 use simulations in which successive interference cancellation is employed, and FIGS. 6 and 8 use simulations in which joint estimation of inter-carrier interference is employed. Each of the graphs of FIGS. 5-8 shows a plurality of curves, numbered in order. The first curve in each of FIGS. 5 and 6 (i.e., each of curves 501 and 601) shows the results for a simulation in which no compensation is performed. The eighth curves in FIGS. 5 and 6 (i.e., curves 508 and 608) show the results for a simulation in which "genie" compensation is performed, i.e., in which the true common phase error and inter-carrier interference (which are known within the simulation) are used in the compensation. The second through seventh curves in FIGS. 5 and 6 show the results for simulations in which k is 50, 25, 10, 5, 2, and 1, respectively. The first seven curves of each of FIGS. 5 and 6 have 1 resource element (RE) per resource block (RB), 1 RE per 1 RB, 2 REs per 2 RBs, 5 REs per 5 RBs, 10 REs per 10 RBs, 25 REs per 25 RBs, and 50 REs per 50 RBs, respectively.

In FIG. 7, in curves 701-707, the numbers of PTRS subcarriers are 0, 5, 10, 25, 25, 50, and 50, respectively, and the numbers of chunks are 0, 5, 10, 25, 1, 50, 2, respectively. Curves 701, 702, and 703 show the results for simulations in which no compensation is used. Compensation is used in the simulations for curves 704-707, with curves 704 and 706 having common phase error compensation only, and curves 705 and 707 also having compensation for 3 and 6 inter-carrier interference terms, respectively. In FIG. 8, in curves 801-805, the numbers of PTRS subcarriers are 0, 5, 10, 25, and 25, respectively, and the numbers of chunks are 0, 5, 10, 25, and 1, respectively. Curves 801 and 802 show the results for simulations in which no compensation is used. Compensation is used in the simulations for curves 803-805, with curves 803 and 804 having common phase error compensation only, and curve 805 also having compensation for 4 inter-carrier interference terms.

In light of the foregoing, some embodiments include a group distributed PTRS structure to be able to perform inter-carrier interference estimation and compensation. Moreover, because the fully distributed PTRS structure with $N_{PTRS}=1$ is a special case of a group distributed PTRS structure, there may be little or no impact to implementations where only CPE is mitigated. The group distributed PTRS structure may make it possible to handle those phase noise models with wide PSD relative to the subcarrier spacing. The group distributed PTRS structure may also have an advantage over a fully localized PTRS structure which may suffer from a deep fading problem if the allocated PTRS subcarriers are experiencing a poor quality channel condition. Some embodiments further provide a frequency domain successive interference cancellation method and joint method for inter-carrier interference estimation, and a frequency domain FIR filter for inter-carrier interference compensation that may improve the performance significantly compared to common phase error compensation only.

As used herein, calculating a first value "based on" a second value means calculating the first value as the output of a function the input to which includes the second value. As used herein "canceling" an estimated error from a signal, or "compensating" a signal for an error, means making a correction to a signal based on the estimated error; this need not result in entirely eliminating, from the signal, the effect of the error. As used herein, two subcarriers are "adjacent" if there are no other subcarriers between them in frequency. A group of carriers is referred to as a group of "adjacent subcarriers" if, for every two carriers in the group there are no subcarriers, not in the group, between the two carriers in frequency.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," "used", and "approximately" may be considered synonymous with the terms "utilize," "utilizing," "utilized," and "about" respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for phase noise common phase error and inter-carrier interference estimation and compensation have been specifically described and illustrated herein, many modifications and variations will be apparent to those skilled in the art. Accordingly, it is to be understood that a system and method for phase error and interference estimation and compensation constructed according to principles of the present disclosure may be embodied other than as specifically described herein. The present disclosure is also defined in the following claims, and equivalents thereof.

What is claimed is:

1. A method of transmitting and receiving data in orthogonal frequency-division multiplexed signals including a plurality of phase tracking reference signal subcarriers, the method comprising:

transmitting a first orthogonal frequency-division multiplexed signal, wherein the phase tracking reference signal subcarriers are in a plurality of subcarriers, arranged in $N_c$ groups, each of the $N_c$ groups comprising a plurality of adjacent subcarriers having a first subcarrier and second subcarrier, wherein a frequency of the first subcarrier is adjacent to a frequency of the second subcarrier;

receiving second orthogonal frequency-division multiplexed signal; and estimating one or more inter-carrier interference terms, including:

canceling, from the second orthogonal frequency-division multiplexed signal, an estimated common phase error to form a first compensated received signal.

2. The method of claim 1, wherein each group includes exactly $N_{PTRS}$ adjacent phase tracking reference signal subcarriers, $N_{PTRS}$ being an integer greater than 0.

3. The method of claim 1, wherein a first group of the $N_c$ groups includes the same number of subcarriers as a second group of the $N_c$ groups.

4. The method of claim 3, wherein a first group includes a first number of adjacent subcarriers at frequencies below the frequencies of the phase tracking reference signal subcarriers of the first group and the second group includes a number, equal to the first number, of adjacent subcarriers at frequencies below the frequencies of the phase tracking reference signal subcarriers of the second group.

5. The method of claim 1, further comprising:
estimating a channel using demodulation reference signal subcarriers from the received second orthogonal frequency-division multiplexed signal;
estimating the common phase error using the estimated channel and phase tracking reference signal subcarriers from the received second orthogonal frequency-division multiplexed signal; and
estimating the one or more inter-carrier interference terms, wherein the estimating of the one or more inter-carrier interference terms includes:
estimating, based on the first compensated received signal, a first inter-carrier interference term.

6. The method of claim 5, further comprising calculating a value of the transmitted signal in a subcarrier using known PTRS pilots.

7. The method of claim 5, wherein the estimating of the inter-carrier interference terms further comprises:
iteratively, for a range of values of an integer i greater than 1 and less than a set integer L:
canceling, from the received second orthogonal frequency-division multiplexed signal, the estimated common phase error, and the first through (i−1)-th inter-carrier interference terms, to form an i-th compensated received signal; and
estimating, using the i-th compensated received signal, an i-th inter-carrier interference term.

8. The method of claim 7, wherein the estimating of the common phase error comprises setting an amplitude of the estimated common phase error to be equal to 1.

9. The method of claim 5, wherein the phase tracking reference signal subcarriers comprise $N_c N_{PTRS}$ subcarriers, arranged in $N_c$ groups, each of the $N_c$ groups comprising $N_{PTRS}$ adjacent subcarriers, $N_{PTRS}$ being an integer greater than 1, and $N_c$ being an integer greater than 1.

10. The method of claim 1, further comprising:
estimating a channel using demodulation reference signal subcarriers from the received signal;
estimating a common phase error using the estimated channel and phase tracking reference signal subcarriers from the received second orthogonal frequency-division multiplexed signal; and
estimating the one or more inter-carrier interference terms, wherein the estimating of the one or more inter-carrier interference terms includes:
jointly estimating, based on the first compensated received signal, L inter-carrier interference terms, L being a set integer greater than 0.

11. The method of claim 10, further comprising calculating a value of the transmitted signal in a subcarrier using known PTRS pilots.

12. The method of claim 11, wherein the estimating of the common phase error comprises setting an amplitude of the common phase error to be equal to 1.

13. The method of claim 10, wherein the phase tracking reference signal subcarriers comprise $N_c N_{PTRS}$ subcarriers, arranged in $N_c$ groups, each of the $N_c$ groups comprising $N_{PTRS}$ adjacent subcarriers, $N_{PTRS}$ being an integer greater than 1, and $N_c$ being an integer greater than 1.

14. A system for transmitting and receiving data in orthogonal frequency-division multiplexed signals including a plurality of phase tracking reference signal subcarriers, the system comprising:
a transmitter, the transmitter being configured to transmit first orthogonal frequency-division multiplexed signals, wherein the phase tracking reference signal subcarriers are in a plurality of subcarriers, arranged in $N_c$ groups, each of the $N_c$ groups comprising a plurality of adjacent subcarriers having a first subcarrier and second subcarrier, wherein a frequency of the first subcarrier is adjacent to a frequency of the second subcarrier; and
a receiver configured to:
receive a second orthogonal frequency-division multiplexed signal; and
estimate one or more inter-carrier interference terms, including:
canceling, from the second orthogonal frequency-division multiplexed signal, an estimated common phase error to form a first compensated received signal.

15. The system of claim 14, wherein each group includes exactly $N_{PTRS}$ adjacent phase tracking reference signal subcarriers, $N_{PTRS}$ being an integer greater than 0.

16. The system of claim 14, wherein a first group of the $N_c$ groups includes the same number of subcarriers as a second group of the $N_c$ groups.

17. The system of claim 16, wherein a first group includes a first number of adjacent subcarriers at frequencies below the frequencies of the phase tracking reference signal subcarriers of the first group and the second group includes a number equal to the first number, of adjacent subcarriers at frequencies below the frequencies of the phase tracking reference signal subcarriers of the second group.

18. The system of claim 14, wherein the receiver is further configured to:
estimate a channel using demodulation reference signal subcarriers from the received second orthogonal frequency-division multiplexed signal;
estimate the common phase error using the estimated channel and phase tracking reference signal subcarriers; and
estimate the one or more inter-carrier interference terms, wherein the estimating of the one or more inter-carrier interference terms includes
estimating, based on the first compensated received signal, a first inter-carrier interference term.

19. The system of claim 18, wherein the receiver is further configured to calculate a value of the transmitted signal in a subcarrier using known PTRS pilots.

20. The system of claim 14, wherein the receiver is further configured to:
;
estimate a channel using demodulation reference signal subcarriers from the received signal;
estimate a common phase error using the estimated channel and phase tracking reference signal subcarriers; and
estimate the one or more inter-carrier interference terms, wherein the estimating of the one or more inter-carrier interference terms includes:

jointly estimating, based on the first compensated received signal, L inter-carrier interference terms, L being a set integer greater than 0.

* * * * *